(12) United States Patent
Wallace

(10) Patent No.: US 9,575,394 B1
(45) Date of Patent: Feb. 21, 2017

(54) ADAPTABLE CAMERA ARRAY STRUCTURES

(71) Applicant: OTOY, INC., Los Angeles, CA (US)

(72) Inventor: Charles Wallace, Los Angeles, CA (US)

(73) Assignee: Otoy, Inc., Los Angeles, CA (US)

( * ) Notice: Subject to any disclaimer, the term of this patent is extended or adjusted under 35 U.S.C. 154(b) by 0 days.

(21) Appl. No.: 14/735,933

(22) Filed: Jun. 10, 2015

(51) Int. Cl.
G03B 17/56 (2006.01)

(52) U.S. Cl.
CPC .................. *G03B 17/561* (2013.01)

(58) Field of Classification Search
CPC .............. G03B 17/561; H04N 5/2251; H04N 5/23238; H04N 13/0242; H04N 5/2258; H04N 2213/001
USPC ........................................................ 396/419
See application file for complete search history.

(56) References Cited

U.S. PATENT DOCUMENTS

| 5,023,725 A * | 6/1991 | McCutchen | G03B 37/04 348/264 |
| 2004/0246333 A1 | 12/2004 | Steuart | |
| 2007/0182819 A1 | 8/2007 | Monroe | |
| 2011/0249100 A1 * | 10/2011 | Jayaram | H04N 5/2253 348/48 |
| 2013/0201296 A1 * | 8/2013 | Weiss | H04N 13/0242 348/48 |
| 2014/0028865 A1 * | 1/2014 | Ohtaka | H04N 5/23203 348/211.4 |
| 2014/0153916 A1 * | 6/2014 | Kintner | G03B 17/561 396/419 |
| 2015/0138311 A1 | 5/2015 | Towndrow | |

OTHER PUBLICATIONS

International Search Report and Written Opinion of corresponding International Application No. PCT/US2016/035152 mailed Sep. 12, 2016.

* cited by examiner

*Primary Examiner* — Rochelle-Ann J Blackman
(74) *Attorney, Agent, or Firm* — James J. DeCarlo; Greenberg Traurig, LLP

(57) ABSTRACT

A housing structure that can be used for forming a variety of camera arrays is disclosed. The housing structure comprises a plurality of camera retaining elements which can adaptably receive and retain cameras of various sizes and shapes. Adjacent camera retaining elements that form the housing structure are connected to each other via moveable couplings that enable the formation of camera arrays of various sizes and shapes.

21 Claims, 16 Drawing Sheets

ADAPTABLE CAMERA ARRAY STRUCTURES

BACKGROUND

Devices such as Occulus Rift and Samsung Gear VR bought virtual reality (VR) content out of the research realm and into the consumer market. Cheaper devices such as Google Cardboard are currently available which allow consumers to use their smartphones as virtual reality devices. User experiences with documentaries, films and games are greatly enhanced when their video content is presented as VR content as it provides viewers/gamers an illusion of having been transported into the world being viewed. This is because the VR content can in some cases be provided as 360 degree panoramic views as opposed to the two-dimensional series of images that is currently used in videos. The 360 degree images are captured using rotational cameras with ultra wide-angle lenses. When combined with head tracking, such 360 degree images allow the viewers to explore the images from different angles as they would in the real-world.

SUMMARY

This disclosure is related to apparatus that enables assembling camera arrays of various sizes and shapes for collecting image data that can be used for generating content, including VR content. An apparatus comprising a housing structure for a plurality of cameras is disclosed in one embodiment. The housing structure comprises a plurality of camera retaining elements and at least one coupling attached to a pair of the camera retaining elements that form an array. Each of the plurality of camera retaining elements can receive and retain a camera and the coupling permits retaining elements in the pair to be connected to and disconnected from each other. The coupling also enables the camera retaining elements to be oriented in changeable orientations relative to each other. In some embodiments, at least one of the plurality of camera retaining elements comprises a structure that adaptably retains cameras of different sizes. In some embodiments, at least one of the plurality of camera retaining elements comprises an elastically deformable member sized and shaped for shape mating retention of a camera body.

In some embodiments, each camera retaining element can be moveably attached to an adjacent camera retaining element of the plurality of camera retaining elements via a magnetic coupling formed and shaped to permit differing angled orientations between the attached retaining elements.

In some embodiments, the plurality of camera retaining elements form a segment comprising an upper camera retaining element, a middle camera retaining element and a lower camera retaining element. The upper camera retaining element is moveably attached to an upper edge of the middle camera retaining element and the lower camera retaining element being moveably attached to a lower edge of the middle camera retaining element. The middle camera retaining element can be oriented along a long axis whereas the upper camera retaining element and the lower camera retaining element are oriented along their respective short axes orthogonally to the long axis of middle camera retaining element. In some embodiments the apparatus comprises a plurality of such segments wherein an edge of a middle camera retaining element of a first segment of the plurality of segments can be attached to an edge of a middle receiving element of an adjacent segment.

In some embodiments, a spherical array of camera retaining elements can be formed from a plurality of such segments. In some embodiments, the array is a linear array comprising a plurality of middle receiving elements, each middle receiving element coupled to at least one adjacent middle receiving element in the array.

In some embodiments the apparatus can comprise a stand configured to hold the array of camera retaining elements. In some embodiments, the stand further comprises a connector configured for receiving and retaining a selected one of a plurality of holding structures. In some embodiments, the selected holding structure can be a ball with apertures on its surface, the holes being configured for receiving and retaining extension rods that are detachably connected to selected retaining elements for holding the array. In some embodiments, at least one of the plurality of camera retaining elements comprises a structure that adaptably retains cameras of different sizes.

An apparatus comprising a spherical housing structure for a plurality of cameras is disclosed in some embodiments. The spherical housing structure comprises a plurality of segments attached to each other. Each segment comprises three camera retaining elements and at least two couplings. Each of the plurality of camera retaining elements is configured to receive and retain a camera. Each coupling is attached to a pair of the camera retaining elements. The coupling permits the camera retaining elements in the pair to be connected to and disconnected from each other, and to be oriented in changeable orientations relative to each other. The apparatus further comprises a motorized stand that receives the spherical housing structure. A holding structure attached atop the stand is configured to hold the spherical housing structure thereon.

In some embodiments, the motor is a servo motor that enables rotatory actuation of a vertical member of the stand so that the spherical housing structure can be actuated through precise angular positions in order to permit the cameras housed in the spherical housing structure to image their surroundings at different angles. In some embodiments, the holding structure is a spiky ball holding structure. In some embodiments, the apparatus comprises a plurality of cameras, each of the plurality of cameras retained in a respective one of the plurality of camera retaining element.

In some embodiments, the coupling comprising two cylindrical members and a joining plate wherein each of the two cylindrical members is attached to a respective one of the camera receiving elements and each of the two cylindrical members are grooved to permit a geared mating engagement with each other.

These and other embodiments will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1A:
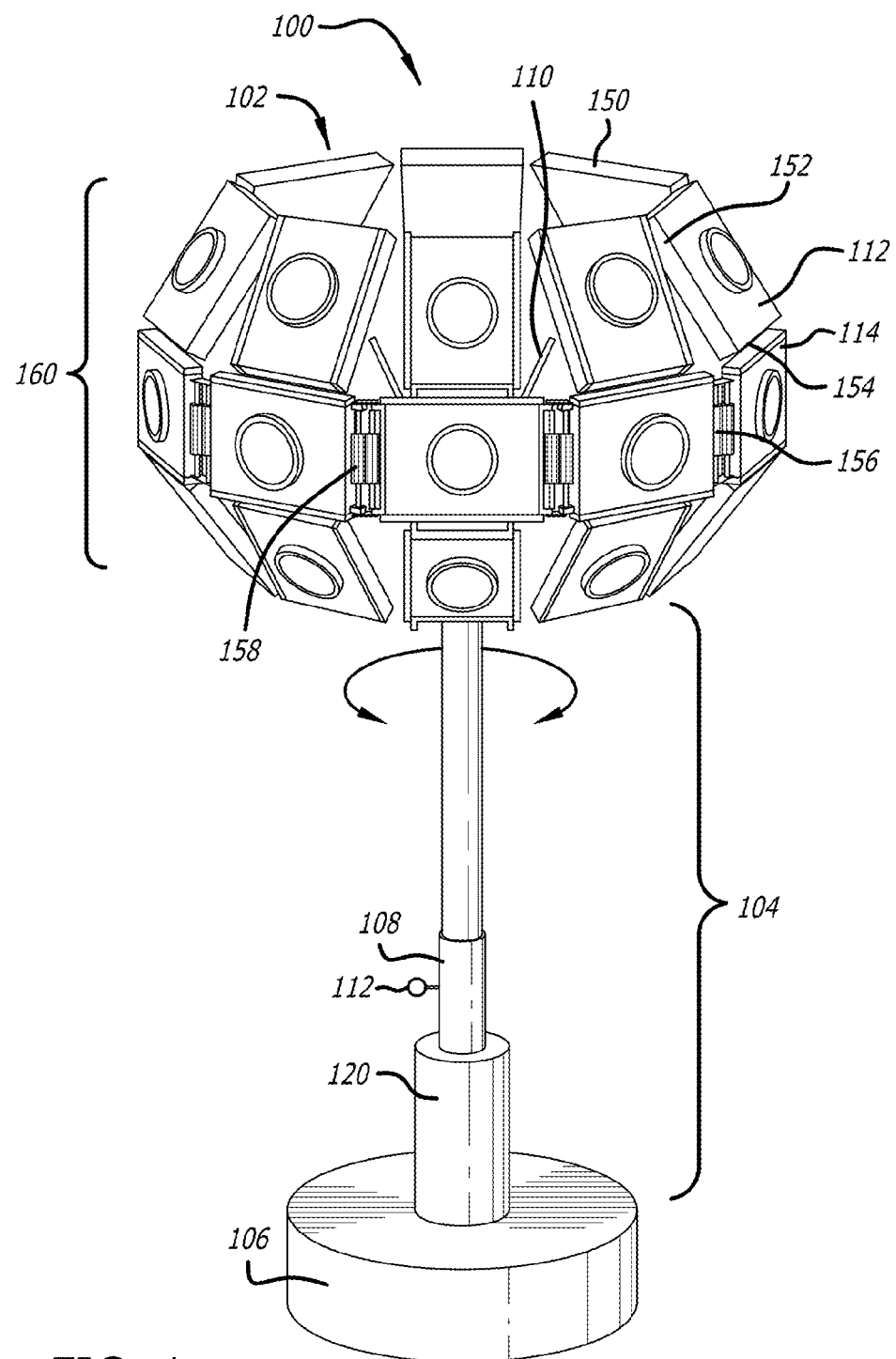
FIGS. 1A, 1B and 1C are illustrations of an apparatus that can be used for imaging a real-world environment from different angles in accordance with one embodiment.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The current trend in video content is to provide immersive virtual reality experiences to users via different virtual reality devices which can range from specialized hardware to a cardboard device holding a smartphone. An immersive virtual panorama such as those captured by rotational cameras allows viewers to be transported into a 360 degree environment which provides a far more powerful visual effect as opposed to a 2-D linear video. Embodiments disclosed herein provide for adaptable, shape-changeable structures that can be used for assembling camera arrays which can be employed for generating images of a real-world environment.

Figure 1B:
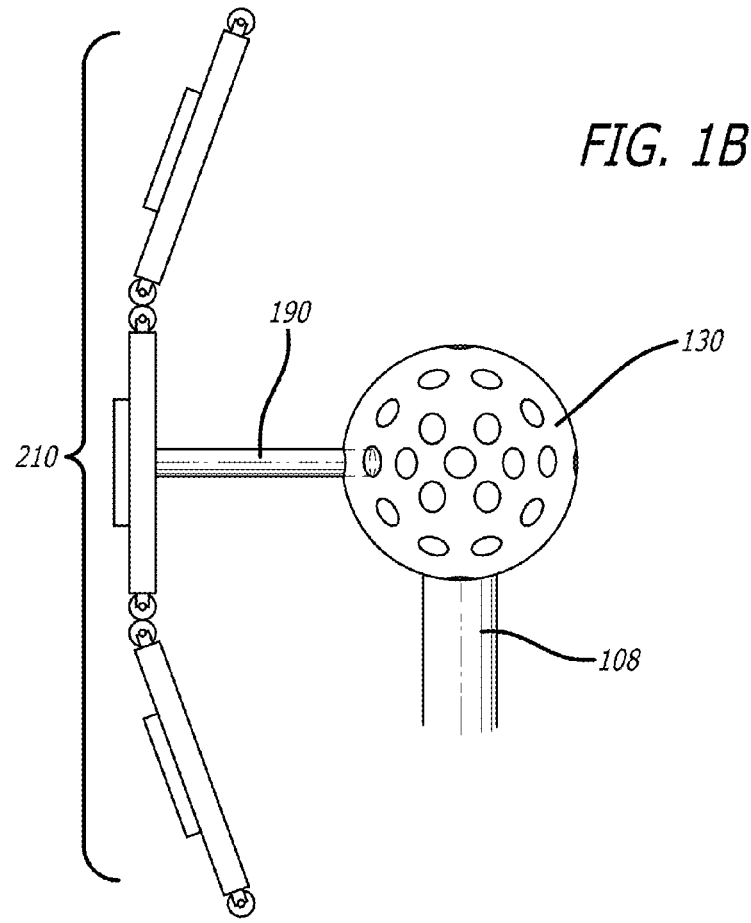
Figure 1C:
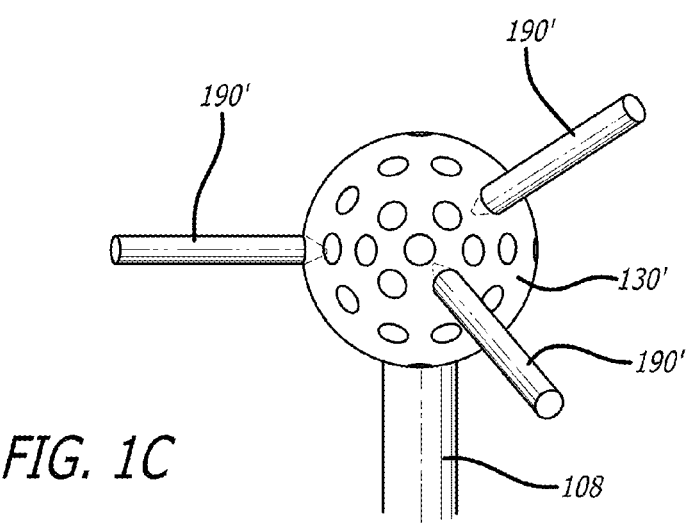

FIGS. 1A-C are illustration of an apparatus 100 that can be used for imaging a real-world environment from different angles in accordance with some embodiments. The images can comprise static photographs or video. The apparatus 100 comprises a camera array 102 having a generally spherical shape mounted on a stand 104. The stand 104 can be made of metal, plastic or other rigid material that is strong enough to hold the camera array 102. A base plate 106 provides stability to the stand 104 and holds the vertical member 108. Base plate 106 can be a flat planar structure or comprise foldable legs for foldability. Likewise member 108 can be formed in a telescoping arrangement for portability, in like manner to a foldable camera tripod. The vertical member 108 is configured to support the camera array 102 via a holding structure 110 that mounts to or is part of stand 104. Holding structure 110 connects the array to the stand for fixed or rotational retention thereby. The stand 104 can thus stably hold the camera array 102 at a certain vertical height from the base 106.

The upper end of the vertical member 108 can be configured to carry various types of holding structures for fixed or rotational movement, such as via a spindle or axle arrangement. In the example shown holding structure 110 is detachably connected to an inside portion of the individual camera holding elements making up array 102. Various shapes types of holding structures such as but not limited to an X-shaped or a Y shaped bar, or a structure resembling a wagon wheel and the like can be utilized (described further herein), depending on the number of elements in the array, the weight of the cameras to be mounted in the array, the diameter of the array, or other physical considerations.

A shown in FIGS. 1B and 1C, the holding structure 110 is mounted for rotation around the longitudinal axis of member 108 in some embodiments. The holding structure comprises a spherical member 130 (FIG. 1B), 130' (FIG. 1C) with apertures at locations around the surface for receiving extension rods or tubes 190, 190' of the same or different lengths that can be screwed or snapped or press fit or otherwise retained in the apertures, thus permitting the flexible deployment of the array with differing radii or differing angles of mounted cameras or for achieving overall array shapes that are generally spherical or other than generally spherical.

In some embodiments, the stand 104 can also comprise an electric motor 120 such as a step motor or a servo motor (or unpowered clockwork that operates in wind up fashion) that can actuate the vertical member 108 to move the camera array 102 through various positions. In some embodiments, a motor or rotational drive 120 can be mounted on an upper portion of member 108 to turn the array 102 directly via the holding structure 110. It can be appreciated that the stand 104 is described only by the way of illustration and not limitation and other designs/structures can be used to hold the camera array 102 in accordance with embodiments described further infra.

The camera array 102 comprises a plurality of cameras 112, 114 etc. retained in respective camera retaining elements 152, 154 of a housing structure 150. Of course the housing structure, or any of the components described herein, can be provided separately or as a unitary product, for example the housing may be provided with or without cameras, as a matter of design or marketing choice. Again, the housing structure 150 can be made of metal, plastic, combinations thereof, or other material strong enough to hold a number of cameras. The camera retaining elements 152, 154 can be adaptably sized for retaining cameras of different sizes and shapes. Various kinds of cameras such as GO PRO HERO 4, POINT GREY USB 3.0 and the like can be accommodated by the camera retaining elements 152, 154 of the housing structure 150. Based on the shape and size of the cameras being received, the camera retaining elements 152, 154 can be provided in a variety of sizes or be adjustable to firmly retain the cameras therein, either by snap fit or elastically deformable shape mating engagement with an outer surface of the camera body, or hook and loop material, or magnetic retention or other retention arrangement adapted to hold a desired camera having a shape in a relatively fixed relationship to its respective retaining element.

In some embodiments, the cameras in the camera array 102 can be fitted with wide lenses or fisheye lenses. By the way of illustration and not limitation, a receiving element 152 can be fitted with spring-based moveable slots or retaining arms or members so that it can act as a cradle to hold cameras of different shapes and sizes.

Each camera retaining element 152 is moveably and detachably coupled to an adjacent camera retaining element 154 via a coupling element 156. The moveable coupling enabled by the coupling element 156 allows a camera retaining element 152 to be positioned at different angles with respect to the adjacent camera retaining element 154. In some embodiments, the camera retaining elements 152 and 154 can be detachably coupled to each other via various coupling mechanisms as described further infra so that the camera retaining element 152 can be detached and another fixed to the camera retaining element 154 in its place. Moreover, such detachable coupling enables varying the number of cameras in a camera array in accordance with the imaging requirements. Based further on the flexibility of the coupling element 156, camera arrays of different sizes and shapes can be achieved as will be detailed further herein. In some embodiments, the coupling element 156 can be a graduated or a metered coupling element. The metered coupling element allows a precise positioning of the camera retaining elements 152 and 154 with respect to each other. Various coupling elements such as but not limited to magnetic elements, snap fit, dove tail, ball and socket and the like can be used to attach the adjacent camera retaining elements to each other.

In some embodiments, the moveable coupling 156 comprises clickable, telescopic hinges 158 that can be actuated through a range of positions to facilitate formation of the spherical camera array 102. The camera retaining elements can thus be bent in different ways so that they do not have to move together. For example, while one of the camera retaining elements is bent at 90 degrees while another camera retaining element can be bent at 10 degrees. In some embodiments, the angles of the adjacent camera retaining elements relative to each other can be set manually.

In order to capture images of the surrounding real-world environment, each of the camera retaining elements comprised in the camera array 102 can be precisely positioned in accordance with the imaging requirements. The camera array 102 is mounted on the stand 104 and the motor 120 can be activated if desired. If the motor 120 is employed, the motor 120 can turn the vertical member 108 clockwise or anti-clockwise through various positions. The cameras in the camera array 102 can be activated to capture video or still photographs of the real-world environment surrounding the apparatus 100 at each position. When the camera array 102 is mounted on the stand 104 as described herein, the image capture devices or cameras in the camera array 102 are intentionally offset forward from a center of rotation of the stand 104. This results in intentionally mis-registered imagery for stitching a 2D panorama from all of the images. Moreover, the field of view of the cameras is very wide relative to the spacing of the horizontal and vertical viewpoints, such that most of one image captured by one of the cameras covers the same scene content as the ones captured by the adjacent cameras, though from a slightly different viewpoint. (In traditional panoramic photography where the camera is mounted nodally on a rotating mechanism or the stand 104, this would not be done, as it would be wasteful of the field of view and image resolution of the camera). The images thus obtained from the cameras in the camera array 102 do not have to be stitched into a single panorama, but rather can be stored in a database as a two-dimensional array of two-dimensional images, forming a four-dimensional light field dataset.

Figure 2:
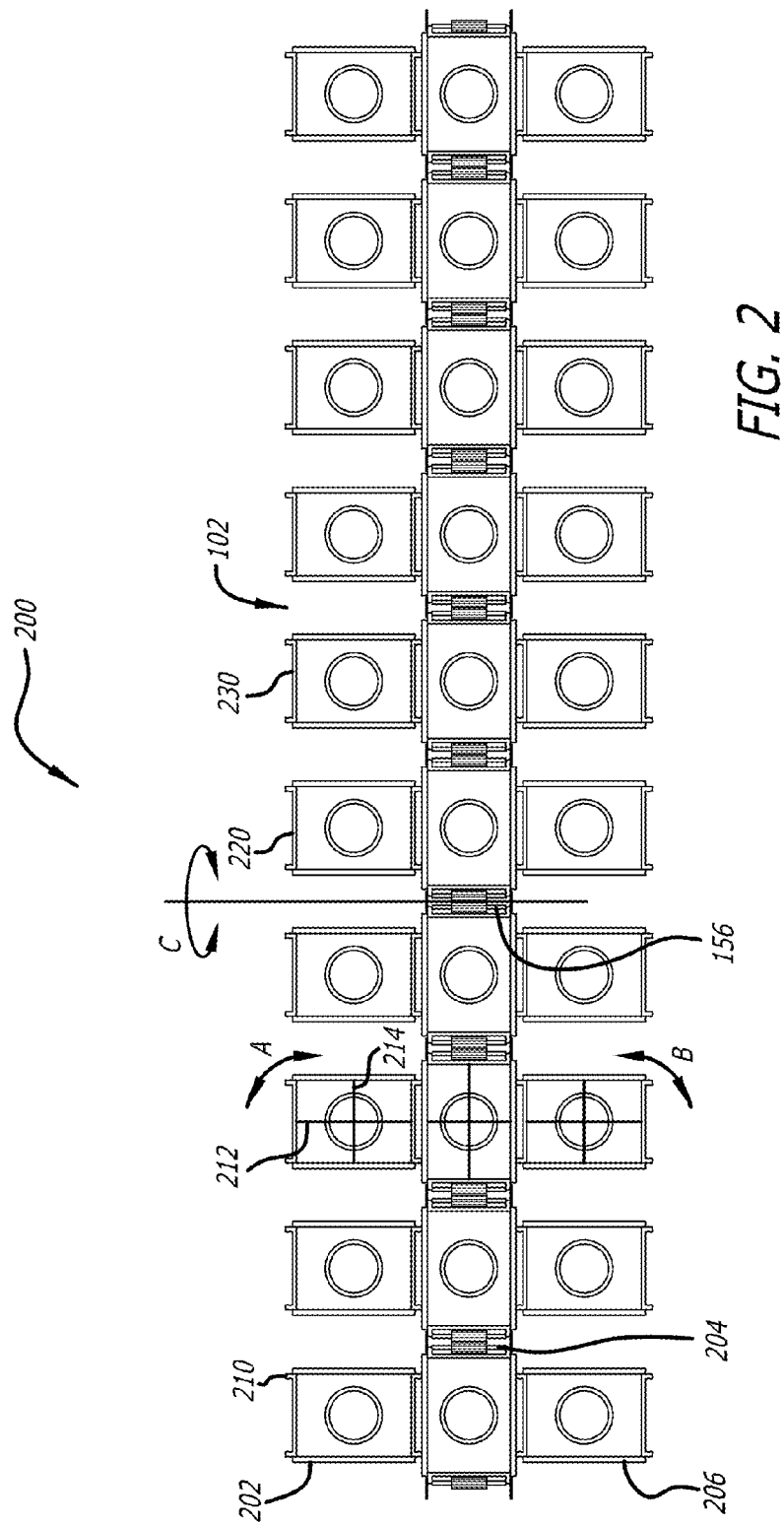
FIG. 2 is an illustration that shows a linear camera array in accordance with some embodiments.

FIG. 2 is an illustration that shows the camera array 102 arranged in a linear configuration 200 in accordance with some embodiments. The flexibility of the moveable coupling elements included between each of the camera retaining elements of the camera array 102 allow the camera array 102 to be folded or unfolded into different configurations.

The spherical configuration of the camera array 102 shown in FIG. 1 can be unfolded to form the linear array 200 of FIG. 2. In some embodiments, the camera array 200 can comprise a plurality of segments 210, wherein each segment comprises three camera retaining elements—an upper camera retaining element 202, a middle camera retaining element 204 and a lower camera retaining element 206. Of course, the terms upper and lower and middle are used for examples in the figures for ease of explanation, but the relative orientations can change depending on the desired configuration the elements are placed in via the coupling elements.

In some embodiments, each retaining element 202, 204 and 206 comprises a generally rectangular shape with a long axis 212 and a short axis 214. The upper camera retaining element 202 and the lower camera retaining element 206 are oriented with their long axes orthogonal to the long axis of the middle camera retaining element 204. Such arrangement of the camera retaining elements within a segment enables formation of a spherical arrangement. The gaps between adjacent upper and adjacent lower retaining elements facilitate actuation of the upper and lower camera retaining elements about the planes of their respective long axes as shown, for example, at A and B. In addition, the middle camera retaining elements can be actuated about their respective short axis as shown at C via the moveable coupling 156. Various configurations of the camera retaining elements and the segments comprising such elements can thus be obtained because of the moveable couplings therebetween. It can be appreciated that the spherical camera array 102 and the relative orientations of the camera retaining elements comprised in the housing structure 150 are only shown be the way of illustration and not limitation. Other configurations for camera arrays with different relative orientations of the camera retaining elements comprised therein are enabled by some embodiments that are detailed further herein.

FIGS. 3A-F are illustrations of the various connections that can be used to couple two camera retaining elements in accordance with some embodiments. Again, it can be appreciated that the details of the moveable coupling 156 are described only by the way of illustration and that other moveable couplings as detailed herein or generally known in the art or which are yet to be invented can be used in accordance with some embodiments. In the example shown at FIGS. 3A and 3B, the moveable coupling 156 comprises two cylindrical members 352, 354 each of which is respectively attached to the middle camera retaining element 312 on the left and the middle camera retaining element 314 on the right. The cylindrical members 352, 354 are joined at the bottom and top by the joining plates 356 and 358. In some embodiments, the cylindrical members 352 and 354 can be coupled to each other via a magnetic mechanism. In some embodiments the surfaces of the cylindrical members 352 and 354 can be grooved to permit a geared mating engagement. In some embodiments, such as those shown in FIG. 3C, a combination of the aforementioned mechanisms of a magnetic contact with the geared mating arrangement can be used.

Figure 3A:
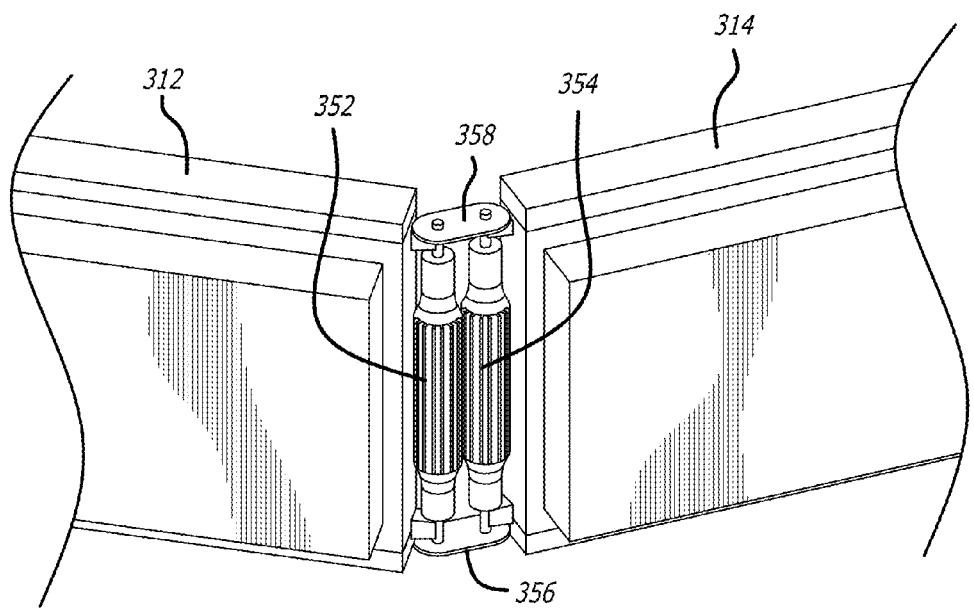
FIGS. 3A, 3B, 3C, 3D, 3E and 3F are illustrations of the various connections that can be used to couple two middle camera retaining elements in accordance with some embodiments.
Figure 3B:
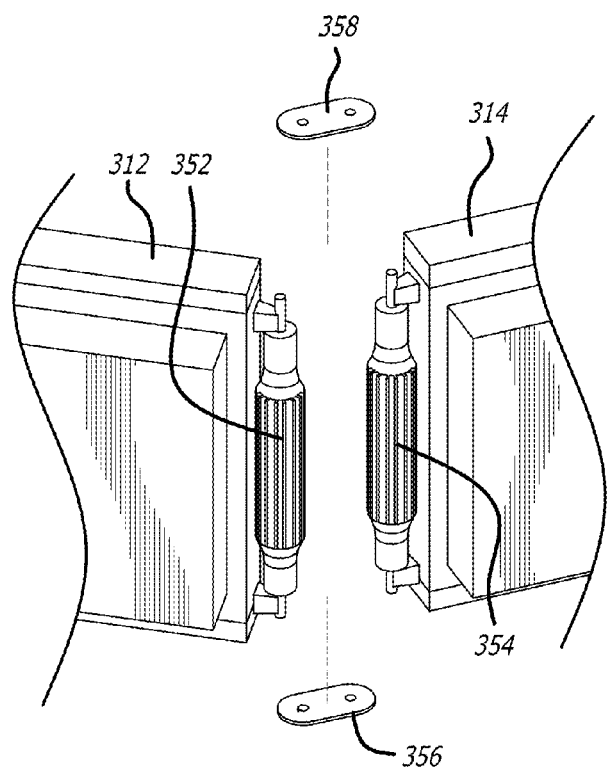
Figure 3C:
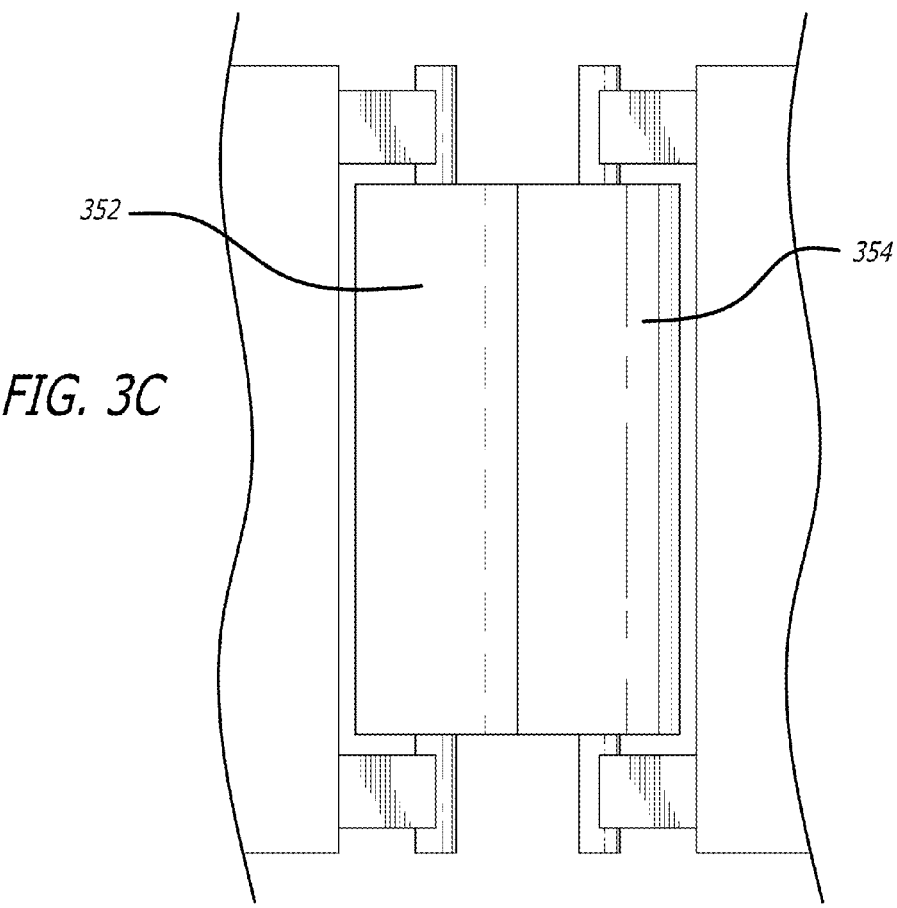
Figure 3D:
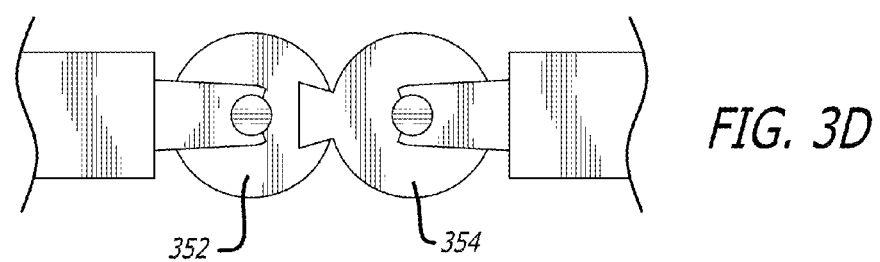
Figure 3E:
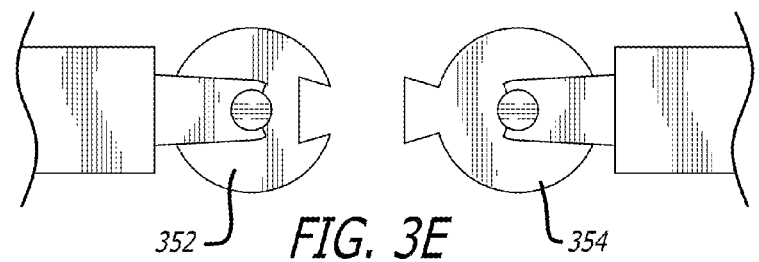

In some embodiments, a snap fit or a dove tail as shown at FIGS. 3D and 3E can be used to couple the cylindrical members 352 and 354. In some embodiments, the cylindrical members 352, 354 can comprise further interior cylindrical members that are telescopically arranged within the external cylindrical members 352 and 354.

Figure 3F:
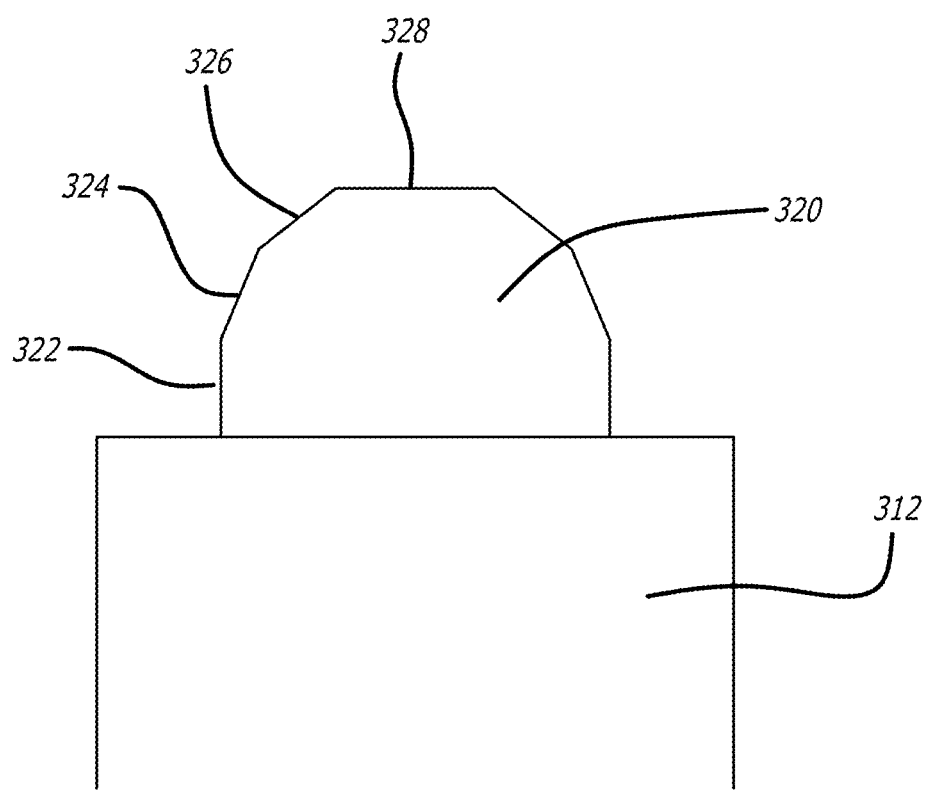

FIG. 3F illustrates a top view of a cross section of the moveable coupling in accordance with some embodiments. In this embodiment, the cylindrical member 352 is replaced by a magnetic bar 320 attached to a side of a retaining element (e.g. a side of element 312 although it could be any or all sides). The magnet is formed with a beveled cross section forming flat surfaces 322, 324, 326 and 328. The angles of the surfaces can be mated with similarly configured connectors on other retaining elements to provide a variety of angular orientations between retaining elements.

Figure 4:
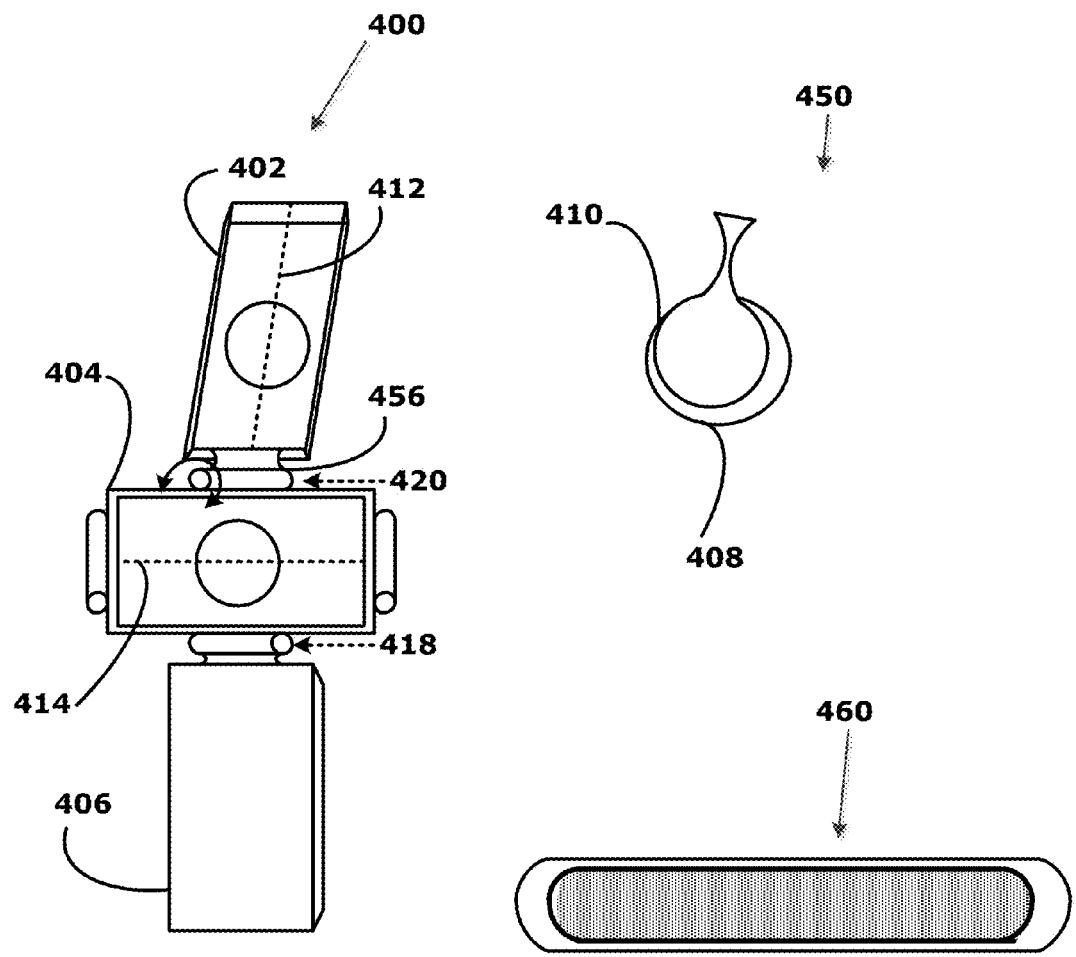
FIG. 4 is a schematic diagram that shows a segment comprising a plurality of camera retaining elements with cameras in accordance with some embodiments.

FIG. 4 is a schematic diagram that shows a segment 400 comprising a plurality of camera retaining elements with cameras in accordance with some embodiments. The segment 400 comprises an upper camera retaining element 402 coupled to the middle camera retaining element 404 via a moveable coupling 456. A lower camera retaining element 406 is also coupled to the middle camera retaining element 404 via similar moveable coupling. In some embodiments, the moveable coupling 456 can comprise a generally cylindrical channel 408 attached to the middle camera retaining element 404 configured to receive a corresponding circular protruding member 410 attached to the upper camera retaining element 402. The cylindrical channel 408 and the circular member 410 can be so shaped and sized for a snug fit that simultaneously allows a range of motion. Upon the circular member 410 being snapped into the cylindrical channel 408, a rotatory movement of the circular member 410 within the channel 408 can be facilitated.

A cross-sectional view 450 of the moveable coupling 456 along the long axis 412 of the upper camera retaining element 402 shows a generally cylindrical channel 408 attached to the middle camera retaining element 404 into which the circular member 410 of the camera retaining element 404 is slotted. A cross-sectional view 460 of the moveable coupling 456 along the long axis 414 is shown when the circular member 410 is snapped into place within the cylindrical channel 408 is also shown. The cylindrical channel 408 and the circular member 410 are sized and shaped for allowing actuation of the circular member 410 therewithin. By the way of illustration and not limitation, the camera retaining element 402 bearing the circular member 410 thereon can be positioned at various angles ranging from 0 to 180 degrees relative to one the middle camera retaining element bearing the cylindrical channel 408. It can be appreciated that the attachment of the cylindrical channel 408 and the circular member 410 to the camera retaining elements is only detailed for illustration and that a converse arrangement wherein the cylindrical channel 408 attached to the upper camera retaining element 402 while the corresponding circular protruding member 410 attached to the middle camera retaining element 404 is also possible in some embodiments.

In addition, the moveable coupling 456 allows an arrangement wherein adjacent camera retaining elements can face different directions in some embodiments. For example, the lower camera retaining element 406 is facing backwards which is opposite to the forwarding facing direction of the upper and middle camera retaining elements 402 and 404. In the case of the upper and the middle camera retaining elements 402 and 404, their respective circular member 410 and cylindrical channel 408 can be coupled with the respective camera retaining elements to which they are attached facing the same direction as shown at 420. In the case of the lower and the middle camera retaining element 406 and 404, their respective circular member and cylindrical channel can be coupled with the respective camera retaining elements to which they are attached facing opposite directions as shown at 418. In some embodiments, a camera retaining element can comprise both the portions of a moveable coupling on opposite edges. Thus, a camera array made up of segments with camera retaining elements facing different directions can collect image data of different scenes simultaneously. For example, when a camera array with segments of camera retaining elements facing opposite directions is placed in a window of a room, the inside and the outside of the room can be simultaneously captured via the cameras slotted into the oppositely directed camera retaining elements.

Figure 5:
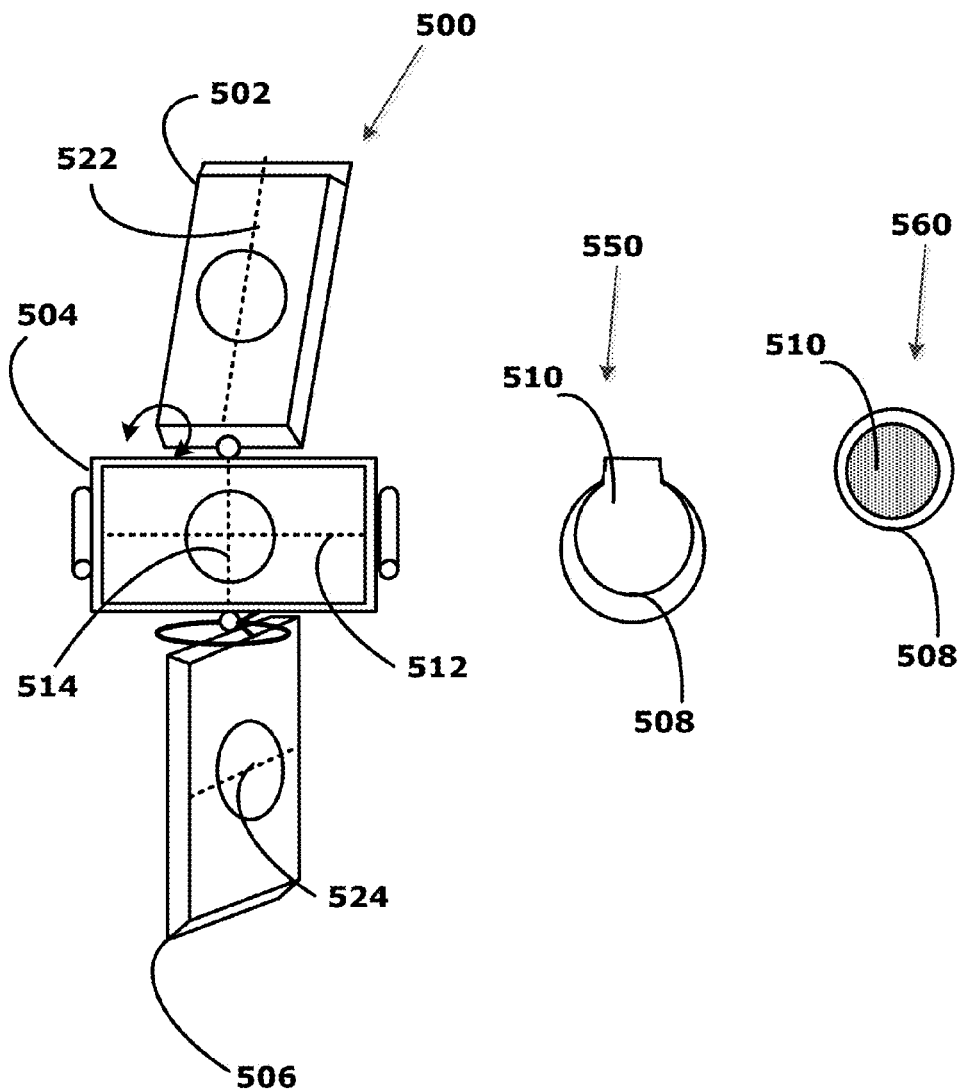
FIG. 5 is a schematic diagram that shows a segment comprising a plurality of camera retaining elements in accordance with some embodiments.

FIG. 5 is a schematic diagram that shows a segment 500 comprising a plurality of camera retaining elements coupled to each other via moveable couplings in accordance with some embodiments. The segment 500 comprises an upper camera retaining element 502 coupled to the middle camera retaining element 504 via a moveable coupling 556. A lower camera retaining element 506 is also coupled to the middle camera retaining element 504 via similar moveable coupling. In some embodiments, the moveable coupling 556 can comprise a ball and socket joint comprising a ball 510 shaped and sized to snugly fit into the socket 508. The ball and socket coupling 556 enables greater movement of the camera retaining elements 502, 504 and 506 relative to each other as compared to the cylindrical channel moveable coupling 456 discussed earlier. The ball and socket, like all other coupling arrangements described herein, may be deployed on any or all sides of a retaining element.

The ball and socket joint enables greater degrees of freedom in the rotation of the upper and lower camera retaining elements 502 and 506 relative to the middle camera retaining element 504. The ball and socket coupling 556 enables rotation of the upper and lower camera retaining elements 502 and 506 relative to the middle camera retaining element 504 in a first direction in a plane containing the short axis 514 of the middle camera retaining element 504. For example, the upper camera retaining element 502 is shown as set in a position with its long axis 522 at an angle to the short axis 514 of the middle camera retaining element 504. The ball and socket coupling 556 also enables rotation of the upper and lower camera retaining elements 502 and 506 relative to the middle receiving element 504 in a second direction in a plane containing the long axis 512 of the middle camera retaining element 504. For example, the lower camera retaining element 506 is shown as being rotated in the second direction with its short axis 524 at an angle to the short axis 514 of the middle camera retaining element 504. A camera array comprising segments like the segment 500 can therefore be used to collect imaging data of a real-world scene in different directions via the camera retaining element bent at different angles as described herein. In other embodiments, less than or more than three retaining elements can make up a segment, depending on the degree of spherical volume to be captured.

A cross sectional view 550 of the ball and socket moveable coupling 556 along a plane containing the short axis 514 of the middle camera retaining element 504 is shown wherein the ball 510 snugly fits into the spherical socket 508. The ball 510 and the socket 508 can be shaped and sized to allow the ball 510 to actuate in substantially 360 degree direction. It can be appreciated that at 550 the ball 510 is shown as being connected to the upper retaining element 502 and the socket 508 is shown as connected to the middle retaining element 504, this is not necessary and other configurations wherein the ball 510 is connected to the middle retaining element 504 and the socket is connected to the upper/lower camera retaining elements is also possible. Another cross section view 560 of the ball and socket moveable coupling 556 along a plane containing the long axis 512 of the middle camera retaining element 512 is shown.

It can be appreciated that the different coupling mechanisms are described herein only by the way of illustration and not limitation. Various other coupling mechanisms currently know or to be invented can be attached to any or all sides of the camera retaining elements described herein to achieve different camera array configurations. In some embodiments, the coupling mechanisms can be attached to the four sides of a camera retaining element so that it can be used as one of an upper, a lower camera retaining element or a middle camera retaining element based on its orientation. Thus, the camera retaining element when oriented with its long axis vertical to the ground can be used as one of an upper or lower camera retaining element. The same camera retaining element when oriented with its axis parallel to the ground can be used as a middle camera retaining element. In some embodiments, different coupling mechanisms can be attached to a camera retaining element so that its position in the segment is fixed as a middle camera retaining element or an upper/lower camera retaining element.

Figure 6:
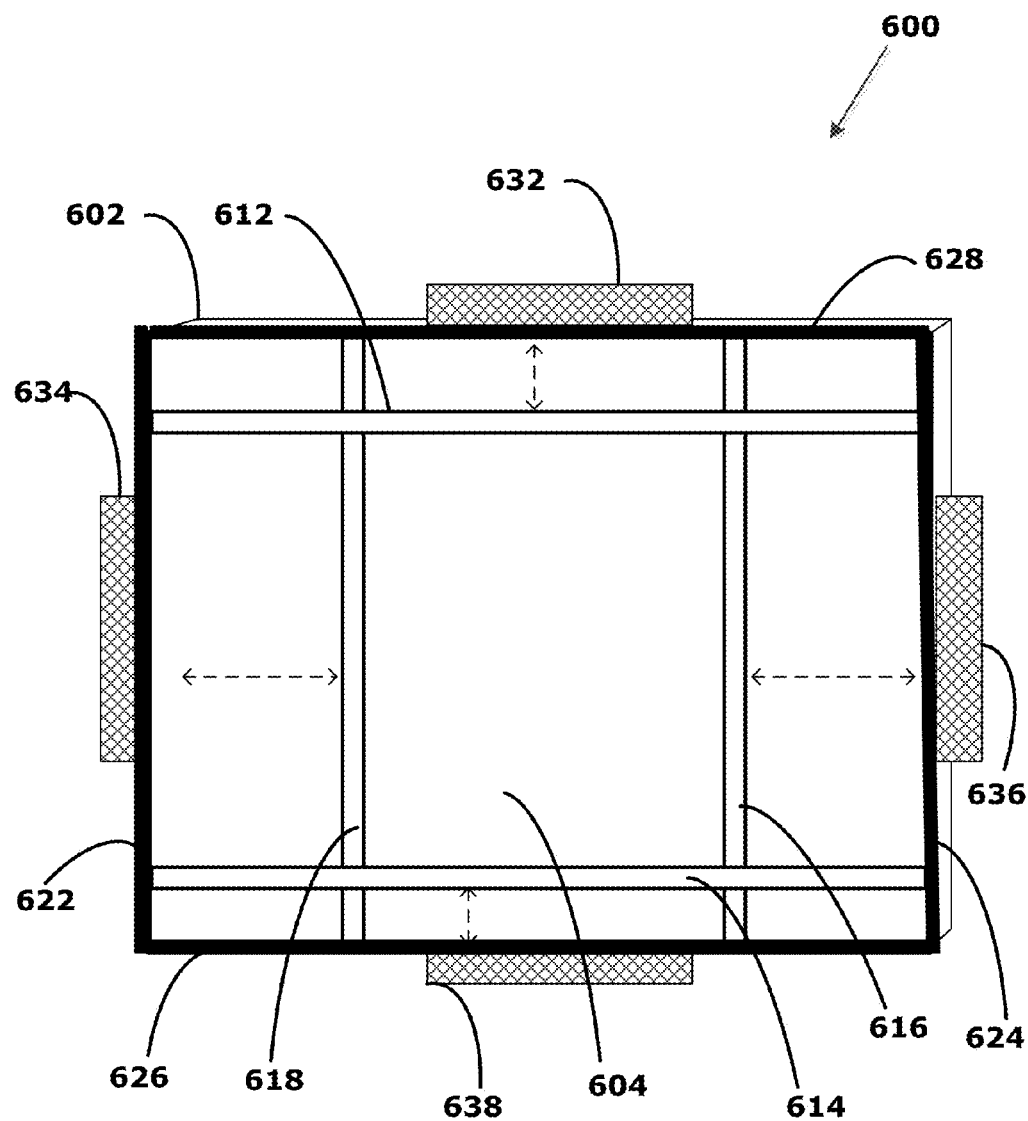
FIG. 6 is a schematic diagram of a camera retaining element in accordance with some embodiments.

FIG. 6 is a schematic diagram of a camera retaining element 600 in accordance with some embodiments. By the way of illustration and not limitation, the camera retaining element 600 can have dimensions of about 60 mm×60 mm with a depth of about 20 mm-30 mm. The camera receiving element 600 can be made of metal, plastic or other natural or artificial material with requisite firmness to withstand wear and tear while holding the various components together. The camera retaining element 600 comprises a base plate 602 that further comprises a camera receiving slot 604 that can be configured to receive and retain a camera. The camera receiving slot 604 can be configured to be flexible so that it can receive and retain cameras of various sizes and shapes.

In some embodiments, the camera receiving slot 604 can be a space formed between a plurality of flexible or moveable members 612, 614, 616 and 618. Each of the plurality of moveable members 612, 614, 616 and 618 can be, for example, a rod or other three-dimensional structure configured with sufficient width to grip a camera when it is popped into the slot 604. The rods or other three-dimensional structures forming the moveable members 612, 614, 616 and 618 can be attached to the receiving plate 602, for example, via springs to facilitate their movement in their corresponding channels. In some embodiments, the plurality of moveable members comprise horizontal moveable members 612, 614 that are configured for movement in the vertical channels 622 and 624. The plurality of moveable members further comprises vertical moveable members 616 and 618 configured for movement in the horizontal channels 626 and 628. When a camera is placed into the receiving slot 604, the horizontal moveable members 612, 614 move along the vertical slots 622, 624 and are held in position via springs. Similarly, the vertical moveable members 616, 618 move along the horizontal slots 626, 628 and are held in position via springs to accommodate the camera in the receiving slot 604.

Although the horizontal moveable members 612 and 614 are shown as being overlaid on the vertical moveable members 616, 618, this is not necessary and a reverse arrangement of the moveable members is facilitated in accordance with some embodiments. The camera retaining element 600 also bears thereon the coupling elements 632, 634, 636 and 638 on each side to enable coupling it to other camera retaining elements to form segments and camera arrays in accordance with embodiments described herein. Although the members 612, 614, 616 and 618 are shown as providing a generally rectangular slot 604, this is only by the way of illustration and not limitation. Other shapes like circular/elliptical receiving slots can be provided based on the shape of the moveable members attached to the receiving plate 602. The camera receiving element 600 therefore can be configured to adaptably receive and retain cameras of various sizes and shapes. Thus, different camera receiving elements in a given camera array can hold different cameras based on the imaging requirements associated with the position of the particular camera retaining element within the camera array.

In some embodiments, the camera retaining element 600 can further comprise elastically deformable members sized and shaped for shape mating retention of a camera body. In some embodiments, such deformable members can be attached to one or more of the vertical and horizontal members 612, 614, 616 and 618 in order to enable a firmer grip of the cameras placed in them.

Figure 7:
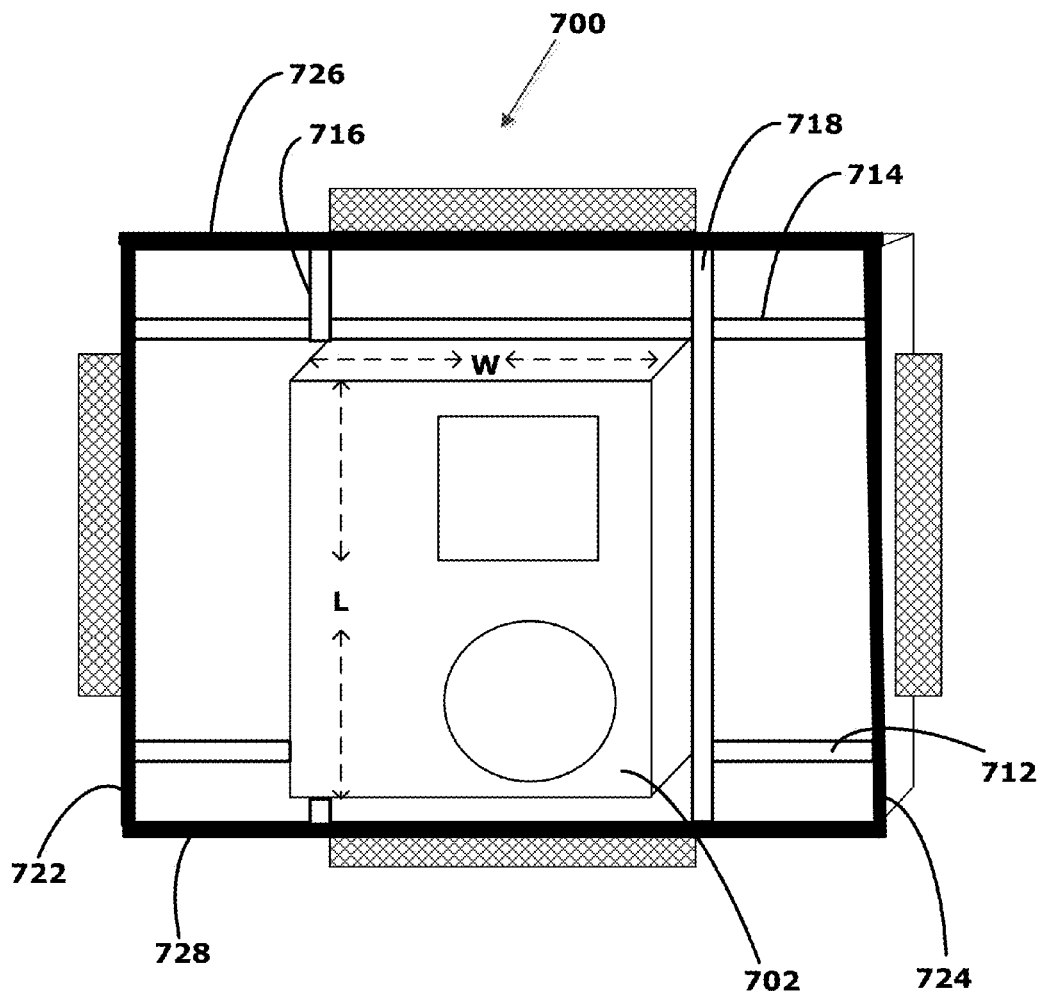
FIG. 7 shows a camera receiving element bearing a camera within its receiving slot in accordance with some embodiments.

FIG. 7 shows a camera receiving element 700 bearing a camera 702 within its receiving slot in accordance with some embodiments. The horizontal moveable members 712, 714 are moved within their corresponding vertical channels 722, 724 and held in their position via, for example, spring action to accommodate the length L of the camera 702. Similarly, the vertical moveable members 716, 718 are moved within their corresponding horizontal channels 726, 728 lying along the upper and lower edges of the camera retaining element 700 and held in their position via, for example, spring action to accommodate the width W of the camera 702. As described herein, the moveable members 712, 714, 716, 718 are configured with sufficient width and their springs provide the necessary force to firmly hold the camera 702 in position within the receiving slot 704 during an imaging procedure.

Figure 8:
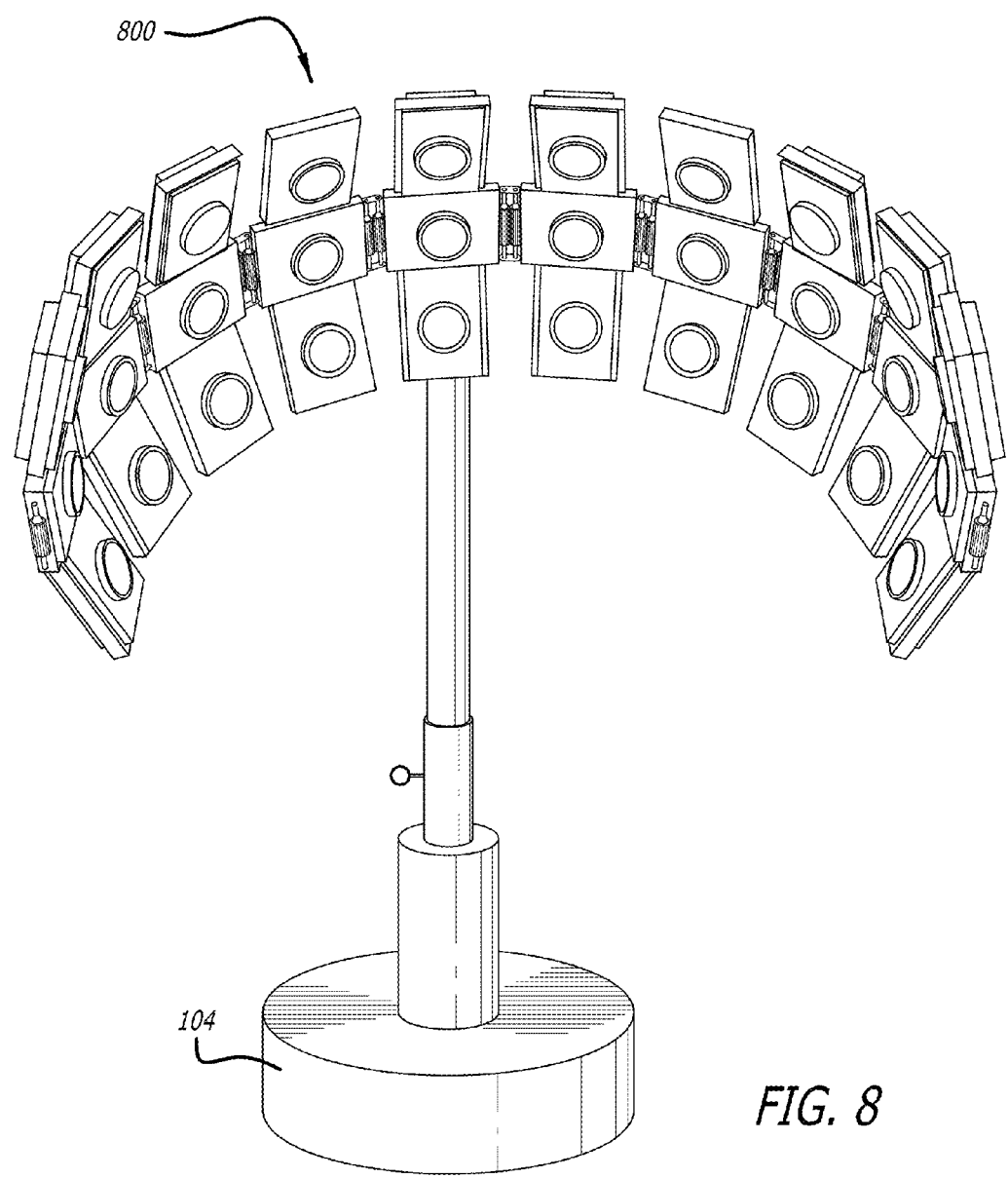
FIG. 8 is an illustration that shows an arrangement of a plurality of segments forming a semi-circular camera array in accordance with some embodiments.

In other embodiments the receiving element may be fashioned as an elastically deformable structure with an aperture large enough to receive a camera, to be held via shape mating frictional engagement with a camera body. Synthetic or natural rubber or other flexible materials can be used for part or all of such an element FIG. 8 is an illustration that shows an arrangement of a plurality of segments for form a semi-circular camera array 800 in accordance with some embodiments. The semi-circular camera array 800 can be employed to image a certain area of a real-world scene from different angles. A stand 104 can be used to hold up the semi-circular array when executing an imaging procedure.

Figure 9:
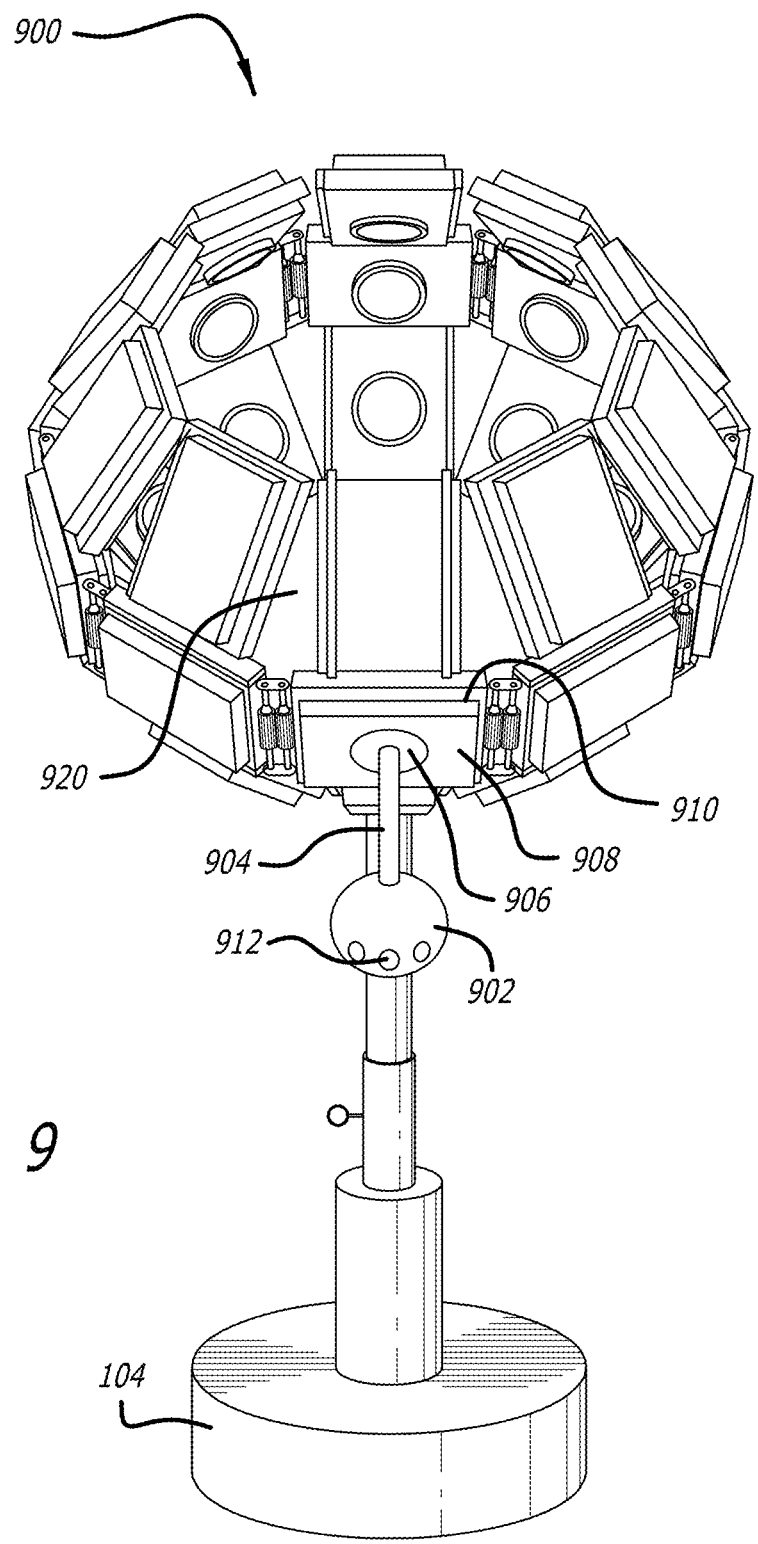
FIG. 9 is an illustration that shows an arrangement of a plurality of segments forming a spherical camera array in accordance with some embodiments.

FIG. 9 is an illustration that shows an arrangement of a plurality of segments forming a spherical camera array 900 in accordance with some embodiments. The plurality of segments with the camera receiving elements in the spherical camera array 900 are arranged so that they enclose a certain volume of a real-world space 920 and capture it from different angles. A stand 104 can be used to hold up the spherical array 900 when executing an imaging procedure. By the way of illustration and not limitation, the upper end of the stand 104 is configured to receive spiky ball holding structure 902 generally used for mounting lighting accessories (as in FIGS. 1B and C). The junction system 902 can have a connector 904 attached via one of the plurality of threaded holes such as the hole 912. A mounting mechanism such as, a vacuum cup 906 can be attached to the connector 904. The vacuum cup 906 can be affixed to the backside 908 of the camera retaining element 910 in order to hold up the camera array 902 for executing an imaging procedure. In some embodiments, a plurality of stands can be employed to hold up camera arrays.

Figure 10A:
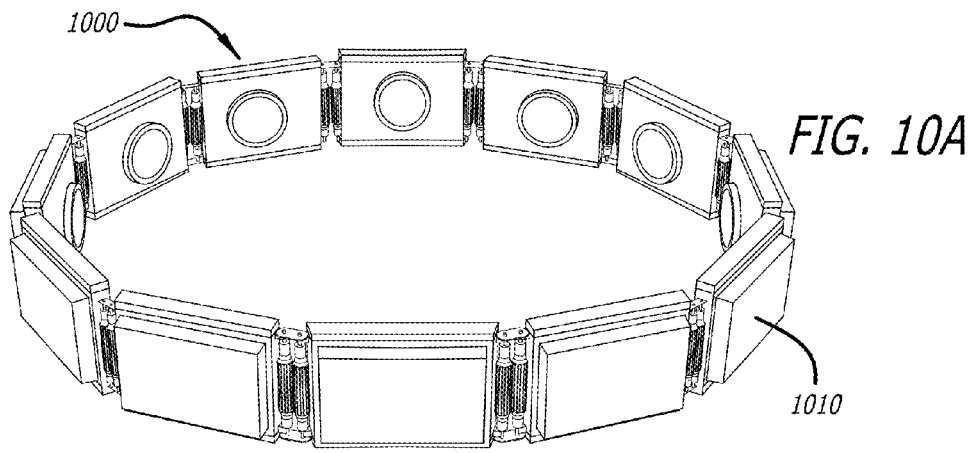
FIGS. 10A, 10B and 10C are illustrations showing various kinds of camera arrays that can be configured from the camera retaining elements in accordance with some embodiments.
Figure 10B:
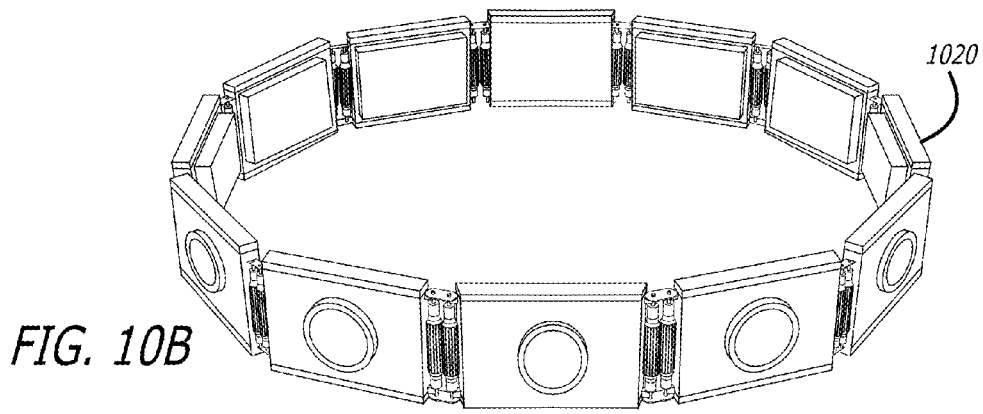
Figure 10C:
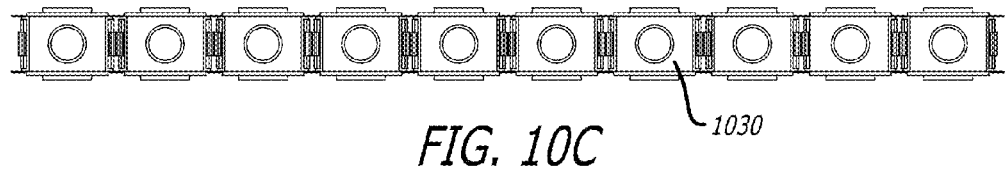

FIGS. 10A, 10B, 10C are illustrations showing various kinds of camera arrays that can be configured from the camera retaining elements in accordance with some embodiments. In the various camera arrays 1010, 1020 and 1030 shown and described herein, only the middle camera retaining elements are used. The camera array 1010 has the various camera retaining elements with their cameras focused on an enclosed space 1000. The various cameras in the camera array 1020 obtain still photographs or video images of the enclosed space 1000 from different directions. Accordingly, the images produced by the camera array 1010 comprise considerable overlap. Another circular camera array 1020 has its camera retaining elements arranged so that the cameras face outwards. While there can be some overlap in the images produced by the cameras in the camera array 1020, the images from different cameras can also comprise certain unique regions not covered by cameras from the adjacent camera retaining elements. The camera retaining elements disclosed herein can also be used to generate a linear camera array 1030 wherein a camera retaining element is attached to at least one adjacent camera retaining element. In the case of the linear camera array 1030 also, there can be some overlap in the images produced, but the images from different cameras can also comprise certain unique regions not covered by cameras from the adjacent camera retaining elements.

FIG. 11A-11F are illustrations that show details of examples of configurations for stands and holding structures used for holding the camera arrays in accordance with some embodiments. It can be appreciated that the details of some of the stands are described herein only by the way of illustration and not limitation and that other stands currently in use or yet to be invented can be employed in accordance with some embodiments. An embodiment of the stand 104 was described and illustrated supra. In some embodiments shown at 11A, the stand 104 comprises a screw or a threaded shaft 1110 for receiving various holding structures. Selections from a plurality of holding structures such as a wagon wheel holding structure 1102 shown in FIG. 11C, a Y-shaped holding structure 1104 shown in FIG. 11D, X-shaped holding structure 1106 shown in FIG. 11E or a spiky ball holding structure shown in FIG. 11 F can be employed based on the type of camera array that is being used for imaging. Each of the structures 1102, 1104, 1106 and 1108 can comprise a bolt that complements the screw 1110 thereby attaching a chosen holding structure to the stand 104. In addition, the vertical member 108 of the stand 104 can be configured to have variable length via the telescopic sleeve arrangement 1112.

Figure 11A:
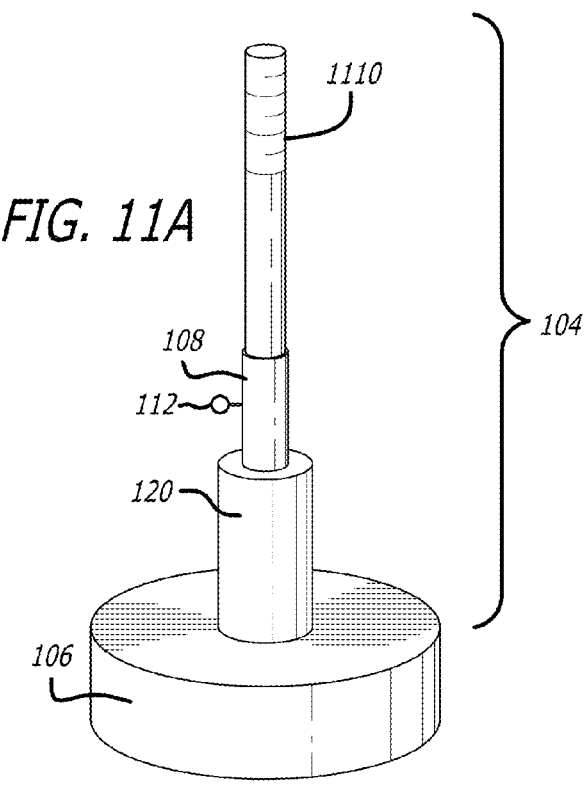
FIGS. 11A, 11B, 11C, 11D, 11E and 11F are illustrations that shows details of stands and holding structures used for holding the camera arrays in accordance with some embodiments.
Figure 11B:
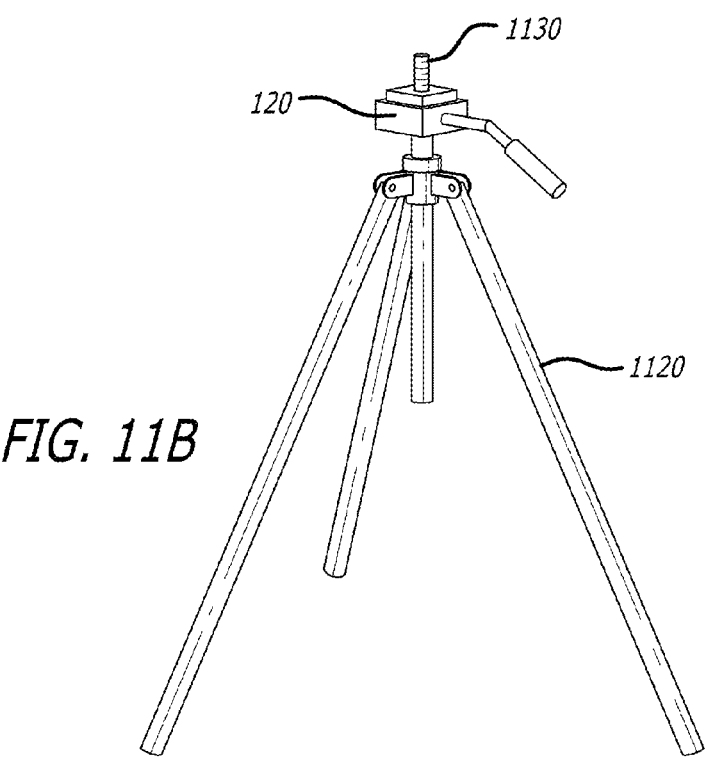
Figure 11C:
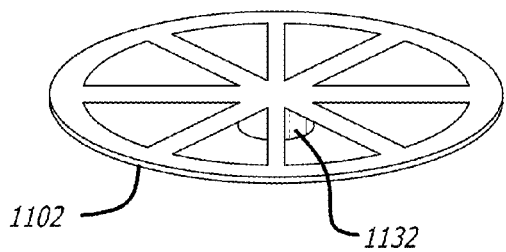

FIG. 11B illustrates a tripod stand 1120 for use with the camera arrays as disclosed in accordance with some embodiments. Similar to the stand 104, the tripod stand 1120 can also comprise a motor 120 which can be mounted at the top of the stand 104. Again, it can be appreciated that the location of the motor 120 at the top of the stand 1120 is only shown by the way of illustration and that the motor 120 can be placed at other parts on the stand 1120. Each leg of the tripod stand 1120 can be configured so that its length may be selected by a user. The tripod 1120 can also comprise a bolt 1130 to receive the various holding structures 1102, 1104, 1106 and a spiky ball holding structure as described earlier at FIGS. 1B and 1C.

Figure 11D:
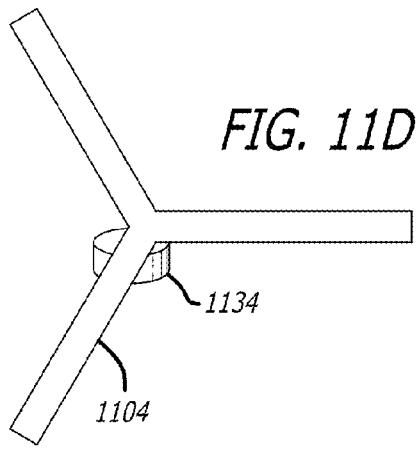
Figure 11E:
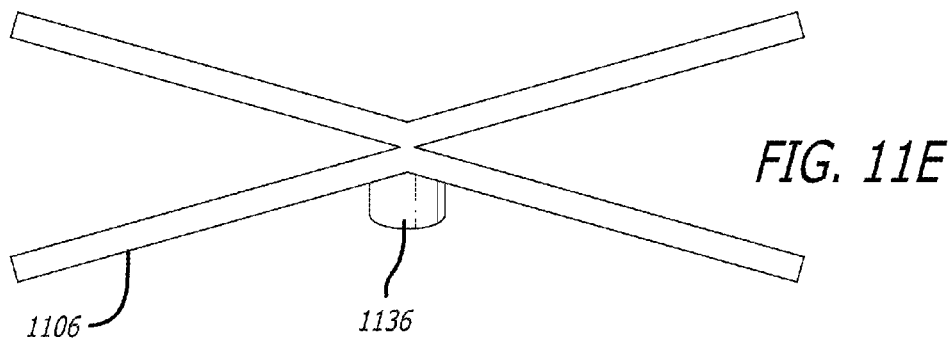
Figure 11F:
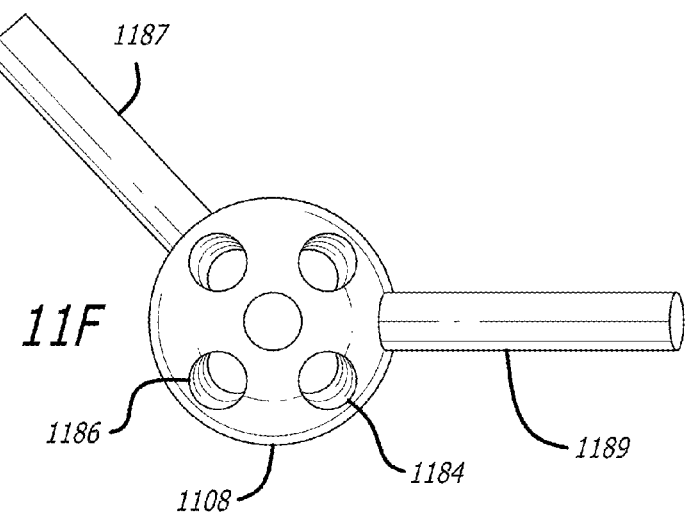

The holding structures 1102, 1104, 1106 and 1108 for the different camera arrays are shown only by the way of illustration and not limitation. Other holding structures of different shapes can be employed for holding up a camera array in accordance with some embodiments. FIG. 11 C shows a wagon wheel shaped holding structure 1102 used for holding, for example, circular, spherical camera arrays which include camera retaining elements in different the directions. A connector such as threaded bolt 1132 enables attaching the wagon wheel holding structure 1102 to the stands 104 or the tripod 1120. FIG. 11D illustrates a Y-shaped holding structure 1104 with its threaded bolt 1134 while FIG. 11E illustrates an X-shaped holding structure 1106 with its connector 1136 can be used for holding camera arrays such as a semi-circular, hemispherical or a linear array 1030. In some embodiments, the connectors can be threaded to matching threaded shafts of the stands 104, 1120. The holding structures 1102, 1104, 1106 and 1108 can be sized and shaped so that the camera array can be attached via a variety of connecting arrangements between the holding structure and one or more elements of the array, such as mating screws and threaded holes, swage fits, friction fits, snap on/off connectors, hook and loop connection, magnetic connection, dovetail slot or grooves, and the like.

As described earlier (FIGS. 1B, 1C and 9), spiky-ball shaped holding structure 1108 shown in FIG. 11 F can also be used for holding various types of camera elements in accordance with some embodiments. The ball 1108 comprises a number of threaded or friction fit holes such as 1184 and 1186 which can be used to screw in or retain extension rods or tubes 1187 and 1189. The threaded holes 1184 or 1186 can be used to attach the ball 1108 to the screw 1110 or 1130. The structures with extension kits similar to a Manfrotto MSY0580A Dado Kit generally available can be used in some embodiments. The connection between rods 1187, 1189 and camera retaining elements described herein can be made via a variety of connecting arrangements between the rods 1187, 1189 and one or more elements of the array, such as mating screws and threaded holes, swage fits, friction fits, snap on/off connectors, hook and loop connection, magnetic connection, dovetail slot or grooves, and the like.

Figure 12:
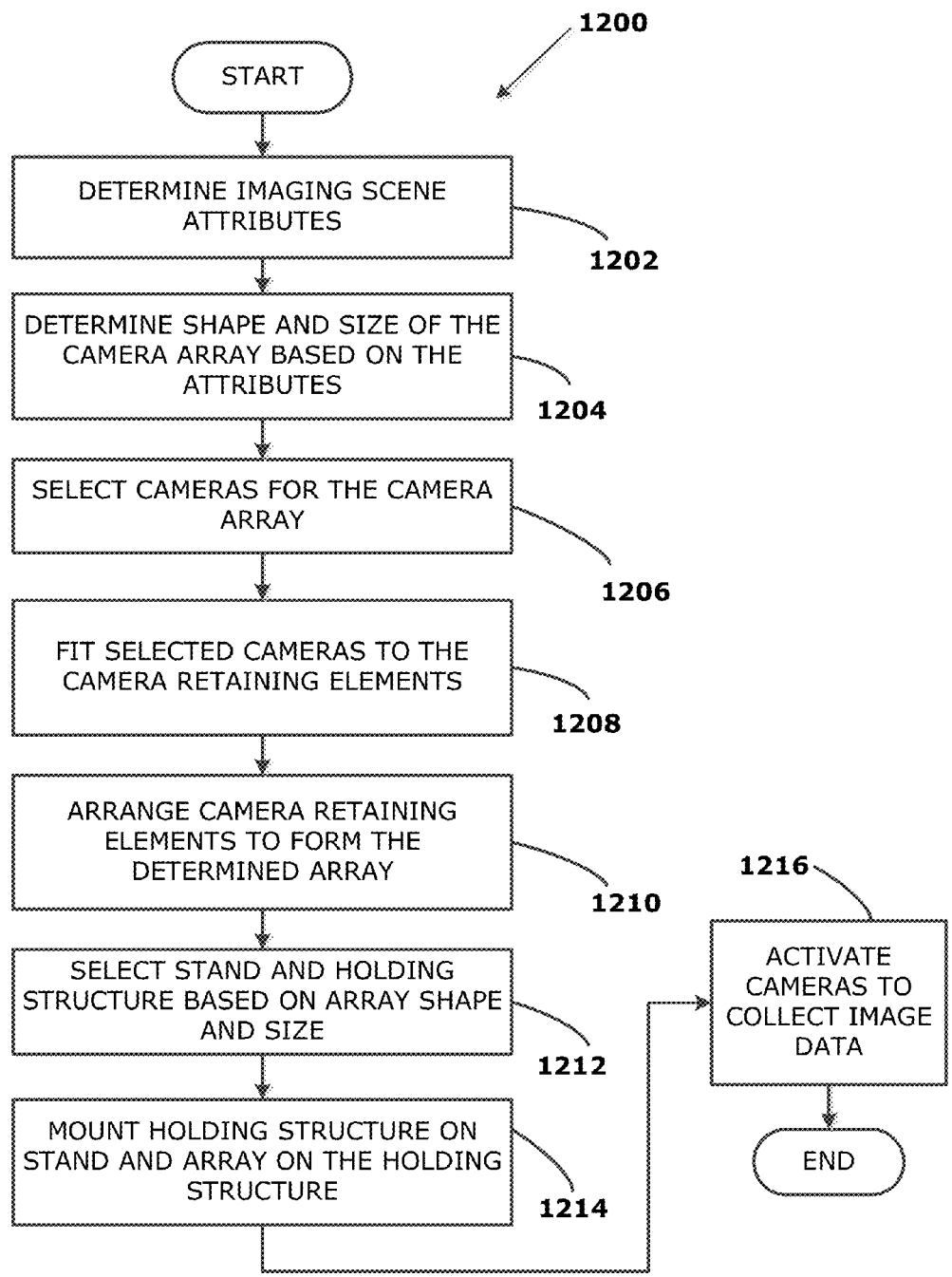
FIG. 12 is a flowchart that details a method of assembling and using a camera array in accordance with some embodiments.

FIG. 12 is a flow chart that details a procedure for assembling or deploying a camera array and using the assembled array for collecting image data in accordance with some embodiments. Initially at 1202, attributes of the real-world scene to be imaged are determined by a user. For example, attributes of the scene such as its volume, area and the directions in which the image data is desired are determined. Based on the attributes, a number, shape and size of the camera array(s) to be assembled is determined at 1204. For example, if a 360 degree image of a real-world volume is desired, it can be determined that a spherical camera array is needed and the size and the number of such spherical arrays can be determined based on the volume of the real-world scene to be imaged. Various cameras for collecting the image data of the real-world scene are selected at 1206. As the camera retaining elements described herein are adaptable to different camera shapes and sizes, different cameras can be used at different positions in the camera array as determined by the user. In some embodiments, the same kind of cameras can be used in the camera array.

Based on the number of cameras selected, a number of camera retaining elements are required so that each camera is attached to a respective camera retaining element at 1208. The camera retaining elements are then assembled to form the camera array. In some embodiments, a plurality of camera retaining elements can form a linear array 1030 to which the upper and lower camera retaining elements are attached. A suitable holding structure and stand for mounting the camera array are selected at 1212. For example, a spherical camera array can be mounted on a wagon wheel holding structure attached to a stand with a circular base. In another example, a linear array can be mounted to a V-shaped holding structure mounted on a tripod 1120. A spiky-ball holding structure 1108 with the requisite extensions can be used for either of the arrays. The selected holding structure and the camera array are mounted on the stand at 1214. Upon positioning the stand to his/her satisfaction within the real-world scene to be imaged, the user can activate the cameras at 1216 to collect the image data. In some embodiments, the cameras can be controlled via electronic remote controllers. In some embodiments, the cameras can be controlled, for example, via apps on user devices such as smartphones. In some embodiments, the cameras that make up the camera array are activated simultaneously to collect image data. The image data thus collected by the cameras can be further processed, for example, by a computing device comprising a processor and memory with programming instructions to generate content. As a 360 degree view of a scene can be recorded in some embodiments the camera arrays disclosed herein are suitable for generating virtual reality content.

Those skilled in the art will recognize that the methods and systems of the present disclosure can be implemented in many manners and as such are not to be limited by the foregoing exemplary embodiments and examples. While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. An apparatus comprising:
   a housing structure for a plurality of cameras, the housing structure comprising:
   a plurality of camera retaining elements forming an array, each of the plurality of camera retaining elements configured to receive and retain a respective one of the plurality of cameras; and
   at least one coupling attached to adjacent camera retaining elements in the array, the coupling permitting the adjacent retaining elements to be connected to and disconnected from each other, and to be oriented at a range of different angles relative to each other.

2. The apparatus of claim 1, wherein at least one of the plurality of camera retaining elements comprises a structure that adaptably retains cameras of different sizes.

3. The apparatus of claim 1, wherein at least one of the plurality of camera retaining elements comprises an elastically deformable member sized and shaped for shape mating retention of a camera body.

4. The apparatus of claim 1, wherein each element being moveably attached to an adjacent camera retaining element of the plurality of camera retaining elements via the coupling formed and shaped to permit differing angled orientations between the attached camera retaining elements.

5. The apparatus of claim 1, wherein each camera retaining element being moveably attached to an adjacent camera retaining element of the plurality of camera retaining elements via a magnetic coupling formed and shaped to permit differing angled orientations between the attached retaining elements.

6. The apparatus of claim 1, wherein one of the plurality of camera retaining elements is detachably coupled to an adjacent camera retaining element in the array via a detachable moveable coupling.

7. The apparatus of claim 1, the plurality of camera retaining elements form a segment comprising an upper camera retaining element, a middle camera retaining element and a lower camera retaining element.

8. The apparatus of claim 7, the upper camera retaining element being moveably attached to an upper edge of the middle camera retaining element and the lower camera retaining element being moveably attached to a lower edge of the middle camera retaining element.

9. The apparatus of claim 7, the middle camera retaining element being oriented along a long axis whereas the upper camera retaining element and the lower camera retaining element are oriented along their respective short axes orthogonally to the long axis of middle camera retaining element.

10. The apparatus of claim 7, further comprising a plurality of segments.

11. The apparatus of claim 7, an edge of a middle camera retaining element of a first segment of the plurality of segments being attached to an edge of a middle receiving element of an adjacent segment.

12. The apparatus of claim 7, the array is a spherical array.

13. The apparatus of claim 7, the array is a linear array comprising a plurality of middle receiving elements, each middle receiving element coupled to at least one adjacent middle receiving element in the array.

14. The apparatus of claim 1, further comprising a stand configured to hold the array of camera retaining elements.

15. The apparatus of claim 14, the stand further comprising a connector configured for receiving and retaining a selected one of a plurality of holding structures.

16. The apparatus of claim 15, the selected holding structure being a ball with apertures on its surface, the apertures being configured for receiving and retaining extension rods that are detachably connected to selected retaining elements for holding the array.

17. An apparatus comprising:
a spherical housing structure for a plurality of cameras, the spherical housing structure comprising:
a plurality of camera retaining elements forming an array, each of the plurality of camera retaining elements configured to receive and retain a respective one of the plurality of cameras; and
at least one coupling attached to adjacent camera retaining elements in the array, the coupling permitting the adjacent retaining elements to be connected to and disconnected from each other, and to be oriented at a range of different angles relative to each other; and a motorized stand that receives the spherical housing structure.

18. The apparatus of claim 17, further comprising a holding structure attached to the stand, the holding structure bearing the spherical housing structure thereon.

19. The apparatus of claim 18, the holding structure is a spiky ball holding structure.

20. The apparatus of claim 17, the at least one coupling comprising two cylindrical members and a joining plate, each of the two cylindrical members is attached to a respective one of the camera retaining element and each of the two cylindrical members grooved to permit a geared mating engagement with each other.

21. The apparatus of claim 17 wherein a motor attached to the motorized stand is a servo motor.

* * * * *